United States Patent
Hyuga

(10) Patent No.: US 7,044,517 B2
(45) Date of Patent: May 16, 2006

(54) FRONT GRILLE FOR A VEHICLE

(75) Inventor: Hiromi Hyuga, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 10/797,088

(22) Filed: Mar. 11, 2004

(65) Prior Publication Data

US 2004/0178664 A1    Sep. 16, 2004

(30) Foreign Application Priority Data

| Mar. 14, 2003 | (JP) | ............................. 2003-070199 |
| Mar. 26, 2003 | (JP) | ............................. 2003-086038 |
| Apr. 4, 2003 | (JP) | ............................. 2003-102040 |
| Apr. 10, 2003 | (JP) | ............................. 2003-106761 |

(51) Int. Cl.
*B60R 19/52*    (2006.01)

(52) U.S. Cl. ............................. 293/193.1; 296/193.1; 293/115; 180/68.6

(58) Field of Classification Search ............ 296/193.1, 296/187.09; 293/115; 180/68.6
See application file for complete search history.

(56) References Cited

U.S. PATENT DOCUMENTS

| 3,792,889 | A | * | 2/1974 | Fuener et al. ................ 293/115 |
| 4,597,603 | A | * | 7/1986 | Trabert ...................... 296/193.1 |
| 5,487,575 | A | * | 1/1996 | Chase ......................... 293/115 |
| 5,503,444 | A | * | 4/1996 | Rouse et al. ................. 293/115 |
| 6,921,117 | B1 | * | 7/2005 | Rackham et al. ............ 293/115 |

FOREIGN PATENT DOCUMENTS

| JP | A-H07-52734 | 2/1995 |
| JP | U-H07-35255 | 6/1995 |

* cited by examiner

Primary Examiner—Joseph D. Pape
(74) Attorney, Agent, or Firm—Posz Law Group, PLC

(57) ABSTRACT

A front grille for attachment to a front part of a vehicle includes a grille main body forming a part of a design surface of the vehicle. The front grille includes an attaching portion for attaching the grille main body to the vehicle, and a portion to be deformed when a load acts.

1 Claim, 11 Drawing Sheets

FRONT GRILLE FOR A VEHICLE

BACKGROUND OF THE INVENTION

The present invention relates to a front grille for attachment to the front part of a vehicle.

This type of front grille has heretofore been disposed so as to be positioned between a pair of headlights in the front part of a vehicle, and attached to the vehicle body or a front spoiler via clips.

Additionally, in recent years, there has been a strong demand for enhancement of protection properties with respect to pedestrians, and various devices have been made so that a part of the shock in a collision is absorbed by the front grille.

As one of the devices, there has been proposed a technique in which a frame portion is disposed on a module carrier attached to the front part of the vehicle, a grille main body formed of a soft synthetic resin, a rubber material or the like and having no corners is fitted in the frame portion and fixed by bonding or the like (e.g., see Japanese Laid-Open Utility Model Publication No. 7-35255, hereinafter referred to as "Patent Document 1").

Moreover, there has also been proposed a technique in which the front grille is molded using high-shock plastic and is attached to the vehicle body so that the grille main body bends, following movement of the front bumper with respect to the vehicle body (e.g., see Japanese Laid-Open Patent Publication No. 7-52734, hereinafter referred to as "Patent Document 2").

However, these front grilles have the following problems.

First, in the front grille described in Patent Document 1, the grille main body is molded using the soft synthetic resin or the rubber material. This causes a problem in that the thickness of the grille main body needs to be increased in order to secure rigidity capable of bearing wind pressure against the grille main body when the vehicle is driven, and the main body becomes heavy. There is also a possibility that the grille main body is not easily positioned with respect to a module carrier and operability becomes poor.

On the other hand, in the front grille described in Patent Document 2, for example, when a shock load is exerted on the grille main body or the front bumper, the grille main body is elastically deformed. Therefore, a restoring force (repulsive force) is generated in the grille main body. There is a possibility that the restoring force forms a force in such a direction as to press a member which contacts the grille main body or the front bumper and the shock load is not easily absorbed.

Moreover, there is also a problem in that broken pieces in a collision scatter/fly and road surface conditions are deteriorated.

BRIEF SUMMARY OF THE INVENTION

The present invention has been achieved by paying attention to the problems present in conventional techniques, and an object of the present invention is to provide a front grille for a vehicle, which is capable of maintaining high operability during assembly onto the vehicle and enhancing protection properties with respect to pedestrians. Another object is to provide a front grille capable of inhibiting broken pieces from flying/scattering.

According to a first aspect of the present invention, there is provided a front grille disposed on the front part of a vehicle. The front grille includes: a grille main body forming a part of the design surface of the vehicle; an attaching portion for attaching the grille main body to the vehicle body; and a portion to be deformed at a time when a load is exerted.

Moreover, according to a second aspect, there is provided a front grille including a part of which is formed of a soft synthetic resin.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will be described hereinafter with reference to FIGS. 1 to 3.

Figure 1:
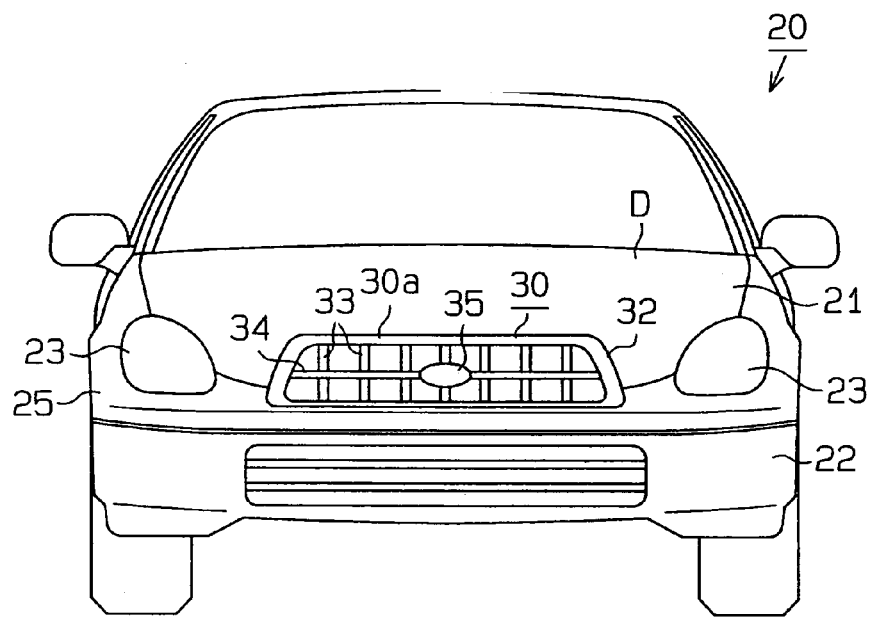
FIG. 1 is a front view of a vehicle to which a front grille of a first embodiment is attached.
Figure 3A:
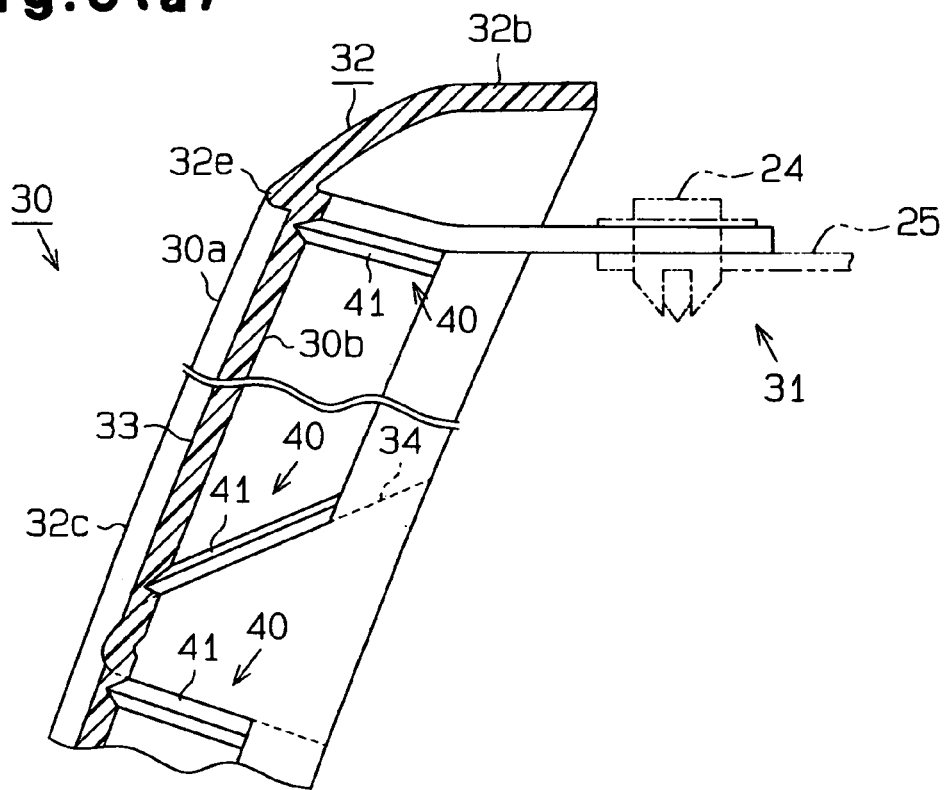
FIG. 3(a) is a sectional view taken along the line 3a—3a in FIG. 2.

As shown in FIG. 1, a front grille is disposed so as to be positioned between the hood 21 and the front bumper 22 and between the headlights 23 in the front part of a vehicle 20. As shown in FIGS. 1 and 3(a), the front surface 30a of the front grille includes a grille main body 30 forming a part of a design surface D, and attaching portions 31 integrally molded so as to protrude toward the vehicle body 25 from a plurality of portions of the grille main body 30. The grille main body 30 is fixed to the vehicle body 25 via fixing members such as a clip 24 in each attaching portion 31.

Figure 2:
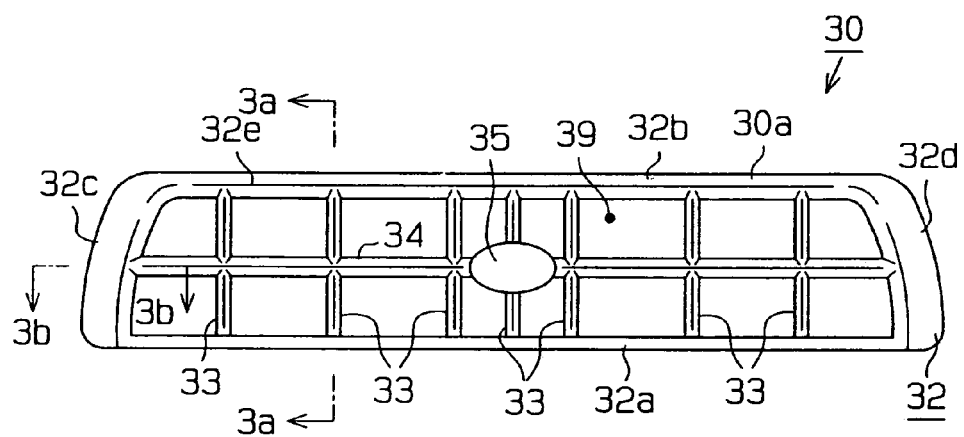
FIG. 2 is an enlarged front view of the front grille of FIG. 1.

As shown in FIG. 2, the grille main body 30 includes a frame portion 32 forming a substantially closed rectangular shape as seen from the front surface 30a, vertical grille portions 33 extending substantially vertically on an inner peripheral side of the frame portion 32, and a transverse grille portion 34 orthogonal to the vertical grille portions 33. In the present embodiment, the grille main body 30 includes seven vertical grille portions 33 and one transverse grille portion 34, and these vertical grille portions 33 are connected to the transverse grille portion 34 to form a cross shape when the grille main body 30 is seen from the front surface 30a. Moreover, an ornament 35 is disposed in a center portion of the frame portion 32, and is connected to one vertical grille portion 33 and transverse grille portion 34. It is to be noted that this ornament 35 may also be omitted.

As shown in FIG. 2, the frame portion 32 includes a lower side portion 32a and an upper side portion 32b extending in a horizontal direction, and a left side portion 32c and a right side portion 32d extending in a vertical direction, when the grille main body 30 is attached to the front part of a vehicle 20. Moreover, in the state in which the grille main body 30 is attached to the front part of the vehicle 20, as shown in FIGS. 3(a) and 3(b), the frame portion 32 includes a bent portion 32e bent rearward from the front of the vehicle in the upper side portion 32b, left side portion 32c, and right side portion 32d.

In addition, the whole front grille is integrally molded by injection molding using molding materials such as an acrylonitrile butadiene styrene (ABS) resin, an acrylonitrile ethylenepropylene styrene (AES) resin, and an alloy of polycarbonate (PC) and the ABS resin.

In the present embodiment, portions to be deformed 40 are disposed in connecting portions between the frame portion 32 and vertical grille portion 33, the frame portion 32 and transverse grille portion 34, and vertical grille portion 33 and transverse grille portion 34. Each portion to be deformed 40 is a portion deformed when a shock load acts on the outer surface of the grille main body 30.

Figure 3B:
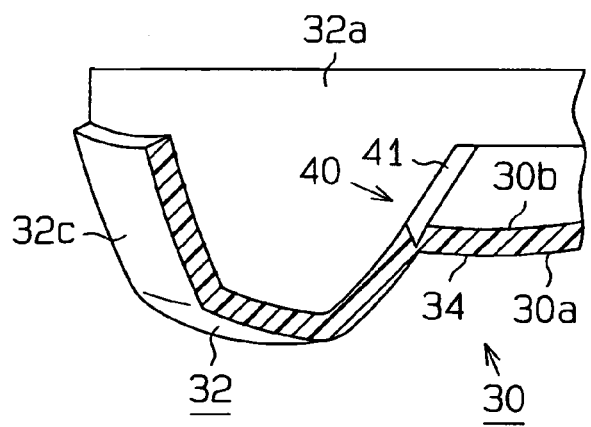
FIG. 3(b) is a sectional view taken along the line 3b—3b in FIG. 2.

As shown in FIGS. 3(a) and 3(b), the portions to be deformed 40 include cutout portions 41 orthogonal to the grille portions 33, 34 in the respective connecting portions. Each cutout portion 41 is formed of a triangular groove formed so that a distance between facing inner surfaces is shortened towards the bottom thereof.

Moreover, in the present embodiment, each cutout portion 41 is disposed on the back surface 30b on a side opposite to the front surface 30a in the grille main body 30.

Furthermore, in the present embodiment, although not shown, the portions to be deformed are also disposed in the respective connecting portions between the vertical grille portion 33 and ornament 35 and between the transverse grille portion 34 and ornament 35. These portions to be deformed are constituted in the same manner as in the portions to be deformed 40.

A depth of each cutout portion 41 or a thickness of each connecting portion in the bottom of the cutout portion 41 can be appropriately changed in accordance with a required bonding strength, a portion to be disposed and the like.

Therefore, according to the first embodiment, the following advantages are obtained (1). In the first embodiment, the portion to be deformed 40 when the shock load acts is disposed in the grille main body 30. Accordingly, even with the grille main body 30 molded of a hard resin material, when the shock load acts on the front surface 30a of the grille main body 30, the grille main body 30 is plastically deformed so as to be bent, drawn, or broken from the portion to be deformed 40, which is a start point. Moreover, a part of the shock load is absorbed by the plastic deformation of the grille main body 30. Therefore, protection properties with respect to pedestrians is enhanced.

Moreover, since the grille main body 30 is molded using the hard resin material, even when the thickness of the grille main body 30 is set to be smaller than that of the grille main body molded using a soft resin material, it is possible to secure rigidity capable of bearing wind pressure on the grille main body 30 during driving of the vehicle 20. Therefore, an increase in weight of the front grille is reduced. Since required rigidity is secured in this manner, the front grille is positioned with respect to the vehicle body 25 with good precision, and the operability of assembly operations is maintained at a high level.

(2) In the first embodiment, the portion to be deformed 40 includes the cutout portion 41. Accordingly, when the shock load acts on the grille main body 30, a stress is concentrated in the vicinity of the cutout portion 41. Then, the grille main body 30 starts to be plastically deformed from the cutout portion 41 which is the start point immediately after the shock load acts. A part of the shock load is absorbed, and the protection properties with respect to the pedestrians are enhanced by the plastic deformation of the grille main body 30.

(3) In the first embodiment, the cutout portion 41 is formed in the triangular groove in which the distance between the facing inner surfaces becomes shorter toward the bottom portion. Accordingly, when the shock load acts on the outer surface of the grille main body 30, the stress generated in the grille main body 30 is locally concentrated in a very small region of the bottom of the cutout portion 41. Therefore, the grille main body 30 is plastically deformed from the cutout portion 41, which is the start point after the shock load acts.

(4) In the first embodiment, the cutout portions 41 are extended to cross the respective grille portions 33, 34 in the respective connecting portions between the frame portion 32 and vertical grille portion 33, between the frame portion 32 and transverse grille portion 34, and between the vertical grille portion 33 and transverse grille portion 34. Furthermore, the cutout portions 41 are extended to cross the respective grille portions 33, 34 in the respective connecting portions between the vertical grille portion 33 and ornament 35, and between the transverse grille portion 34 and ornament 35. Accordingly, a sink mark is not easily generated in the frame portion 32, vertical grille portion 33, or transverse grille portion 34 as compared with a case where the cutout portions are disposed on general portions other than the connecting portions in the frame portion 32, vertical grille portion 33, or transverse grille portion 34. Therefore, the appearance of the grille main body 30 is enhanced.

(5) In the first embodiment, the cutout portion 41 is disposed on the back surface 30b of the grille main body 30. Accordingly, the cutout portion 41 is not visible from the front surface 30a of the grille main body 30, and the appearance of the front grille is enhanced.

It is to be noted that the first embodiment may also be modified as follows.

In the first embodiment, the cutout portions 41 are not limited to a constitution in which the cutout portions are disposed in the respective connecting portions between the frame portion 32 and vertical grille portion 33, the frame portion 32 and transverse grille portion 34, the vertical grille portion 33 and transverse grille portion 34, the vertical grille portion 33 and ornament 35, and the transverse grille portion 34 and ornament 35. The cutout portion 41 may also be constituted to be disposed in at least one arbitrary connecting portion among the respective connecting portions.

Figure 4:
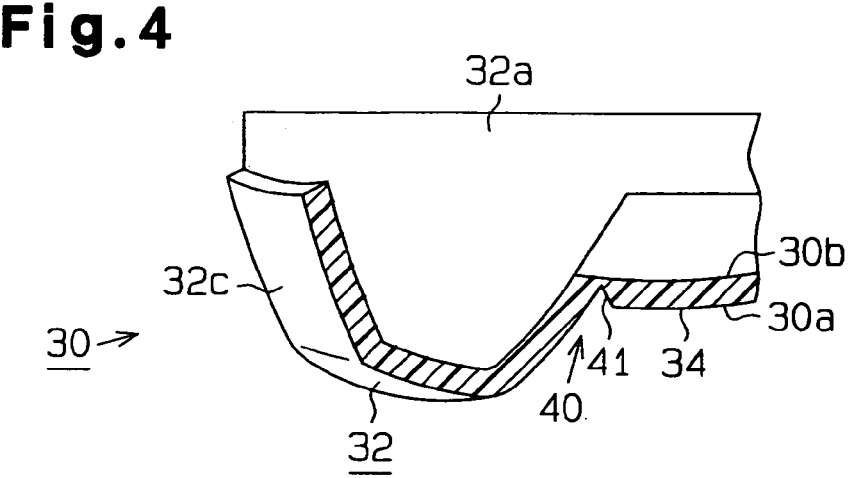
FIG. 4 is a sectional view showing a disposed position of a cutout according to a first modification.

In the first embodiment, the cutout portion 41 may also be constituted to be disposed in the front surface 30a of the grille main body 30 as shown in a first modification of FIG. 4. In this case, the cutout portions 41 are usable as parting lines of surface ornaments such as painting and plating on the design surface (front surface 30a). It is to be noted that FIG. 4 shows only the cutout portion 41 disposed in the connecting portion between the frame portion 32 and transverse grille portion 34, but even the cutout portion 41 disposed in the other connecting portion may also be disposed in the front surface 30a of the grille main body 30. The cutout portion 41 may also be disposed in both the front surface 30a and the back surface 30b of the grille main body 30 in each connecting portion.

Figure 5:
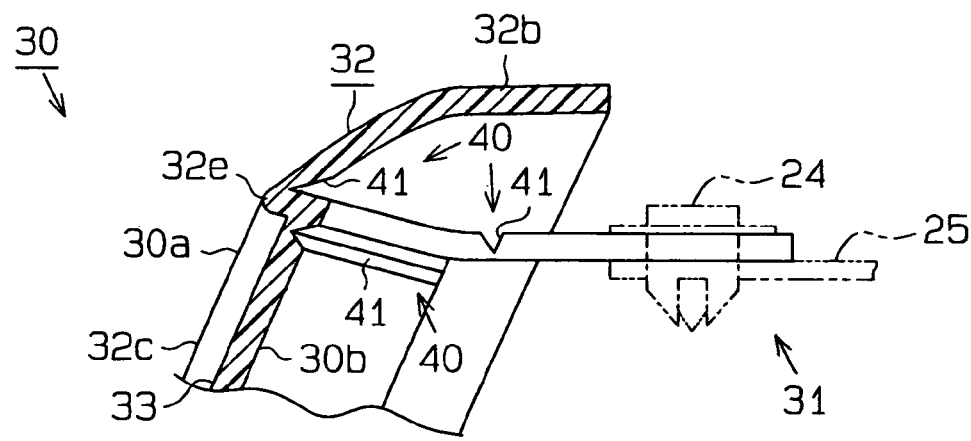
FIG. 5 is a sectional view showing the disposed position of a cutout according to a second modification.

In the first embodiment, as shown in a second modification of FIG. 5, the cutout portion 41 may also be extended along the bent portion 32e of the frame portion 32. In this case, the cutout portion 41 may also be extended over the whole bent portion 32e or along a part of the bent portion.

In this case, when a shock load directed downward from above the vehicle acts with respect to the grille main body 30, the stress is locally concentrated in a smaller region in a portion of the frame portion 32 on which the shock load acts and in the vicinity of the bent portion 32e. Accordingly, the frame portion 32 is easily folded from the bent portion 32e, which is the start point, and a part of the shock load is absorbed.

Moreover, similarly as shown in FIG. 5, the cutout portion 41 may also be provided in the connecting portion between the grille main body 30 and attaching portion 31.

In the first embodiment, the shape of the cutout portion 41 is not limited to the triangular groove. The cutout portion 41 may also be constituted in such a manner that a sectional shape of the cutout portion forms, for example, a circular shape, an elliptic shape, a staircase shape, or a U-shape.

Figure 6:
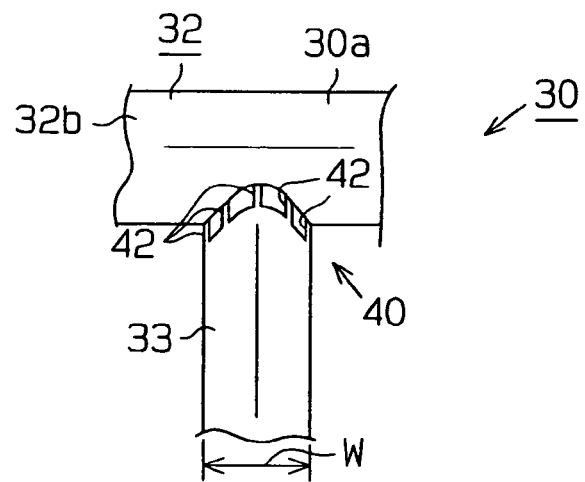
FIG. 6 is a plan view showing a portion to be deformed according to a third modification in an enlarged view.

In the first embodiment, the portion to be deformed 40 is not limited to the cutout portion 41. As shown in a third modification of FIG. 6, instead of the cutout portion 41, at least one joint portion 42 may also be disposed having a width smaller than a width W of the vertical grille portion 33 when the grille main body 30 is seen from the front surface 30a. Alternatively, at least one joint portion 42 may also be disposed having a width smaller than a width W of the transverse grille portion 34 when the grille main body 30 is seen from the front surface 30a. In these cases, the joint portion 42 may be formed, for example, in a bar shape, plate shape or the like. Moreover, in each connecting portion, the number of joint portions 42 or a total sectional area of the joint portion 42 in a plane orthogonal to each joint portion 42 may be appropriately changed in accordance with a required bonding strength, disposed portion or the like.

In this case, an advantage similar to that described in item (1) of the first embodiment is obtained. That is, when the shock load acts on the grille main body 30, the stress is concentrated on the joint portion 42, and therefore the grille main body 30 can be plastically deformed from the joint portion 42 which is the start point immediately after the shock load acts.

Figure 7:
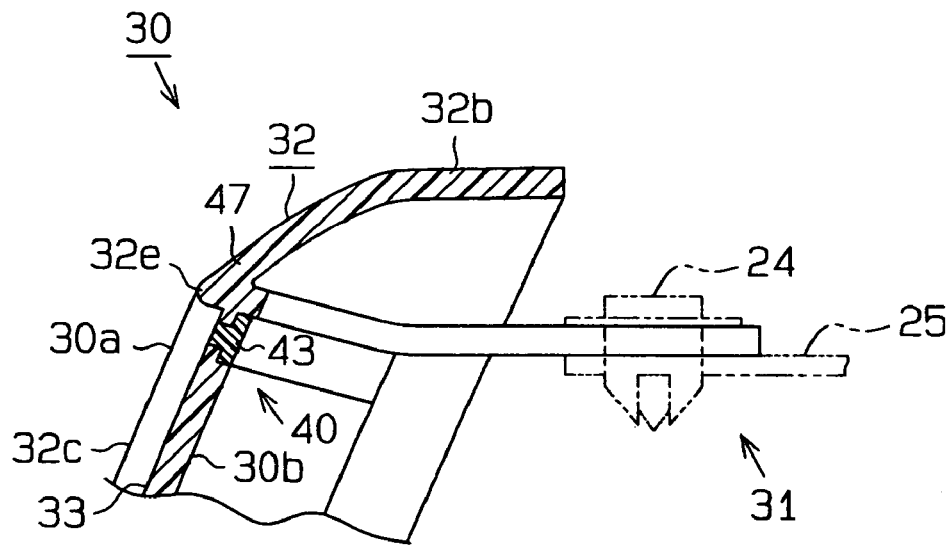
FIG. 7 is a sectional view showing the portion to be deformed according to a fourth modification in an enlarged view.

Furthermore, as shown in a fourth modification of FIG. 7, the grille main body 30 may comprise a first resin portion 47 molded using a first resin material. The portion to be deformed 40 may comprise a second resin portion 43 disposed in the first resin portion 47 and formed of a second resin material having a rigidity lower than that of the first resin portion 47. When the first resin material is the ABS resin, for example, a soft ABS resin or the like is usable as the second resin material. It is to be noted that the second resin material may be appropriately changed in consideration of bonding properties with the first resin material, the bonding strength required in the second resin portion 43, the disposed portion, recyclability of the front grille and the like.

In this case, when the shock load acts on the grille main body 30, the second resin portion 43 may buckle or fall off. Therefore, the whole grille main body 30 may be plastically deformed immediately after the shock load acts.

In the first embodiment, some of the cutout portions 41, joint portions 42, and second resin portions 43 may be arbitrarily disposed in different connecting portions with respect to the grille main body 30.

Figure 8:
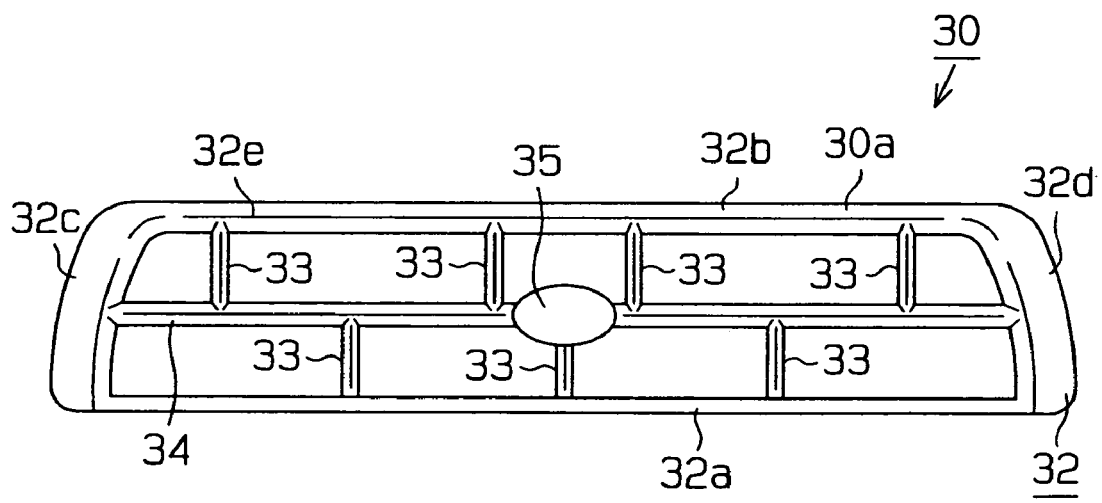
FIG. 8 is a front view of a front grille according to a fifth modification.
Figure 9:
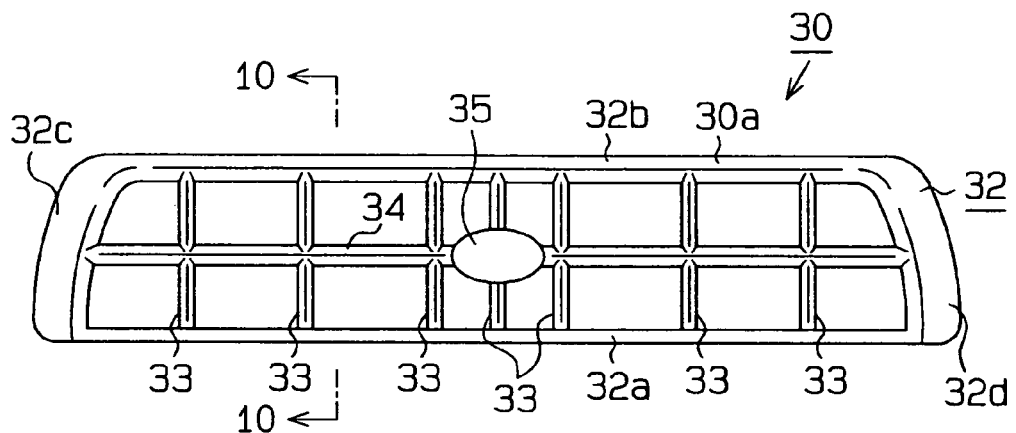
FIG. 9 is a front view of the front grille according to a second embodiment.

In the first embodiment, for example, as shown in a fifth modification of FIG. 8, when the grille main body 30 attached to the front part of the vehicle 20 (see FIG. 1) is seen from a design surface D side, the vertical grille portion 33 may also be connected to the transverse grille portion 34 so as to form a T or inverted T shape.

In such a configuration, the transverse grille portion 34 may be alternately connected to the vertical grille portions 33 on the opposite sides. Accordingly, a spatial portion is formed in the transverse grille portion 34 on a side opposite to a portion connected to the vertical grille portion 33. Moreover, when the shock load directed downward from above the vehicle acts on the grille main body 30, the transverse grille portion 34 bends so as to enter each spatial portion. Therefore, the whole grille main body 30 easily bends in the vertical direction, and absorption properties of the shock load acting downward from above the vehicle are enhanced in the grille main body 30.

In addition, when the grille main body 30 attached to the front part of the vehicle 20 is seen from the side of the design surface D, the vertical grille portion 33 may also be connected to the transverse grille portion 34 so as to form a transverse T shape.

In such a configuration, for example, when the shock load directed toward the right from the left of the vehicle acts on the grille main body 30 in the same manner as in the front grille shown in FIG. 8, the vertical grille portion 33 bends so as to enter each spatial portion. Therefore, the grille main body 30 entirely and easily bends in a transverse direction, and the absorption properties of the shock load acting in the transverse direction of the vehicle are enhanced in the grille main body 30.

In the first embodiment, the portions to be deformed 40 may also be disposed in arbitrary positions of the general portions other than the connecting portions between the frame portion 32 and the vertical grille portion 33, the frame portion 32 and the transverse grille portion 34, and the vertical grille portion 33 and the transverse grille portion 34 with respect to the frame portion 32, the vertical grille portion 33, and the transverse grille portion 34.

In the first embodiment, the front grille is not limited to the front grille including both the vertical grille portion 33 and the transverse grille portion 34. The present invention may similarly be applied to a front grille having only at least one vertical grille portion on an inner peripheral side of the frame portion, or a front grille having only at least one transverse grille portion on the inner peripheral side of the frame portion. For these front grilles, the portions to be deformed 40 may also be disposed in the connecting portions between the frame portion and vertical grille portion, and the frame portion and transverse grille portion. In this case, the advantage similar to that described in item (4) of the above-described embodiment is obtained. It is to be noted that the portion to be deformed 40 may also be disposed in the arbitrary position other than the connecting portion in at least one of the frame portion and each grille portion.

In the above-described embodiment, the front grille is not limited to the front grille including the vertical grille portion 33 and the transverse grille portion 34. The present invention may also similarly be applied to the front grille in which an outside air introducing hole 39 (see FIG. 2) positioned in the inner periphery of the frame portion have shapes other than square shapes, such as a triangle, rhombus, pentagon, hexagon, circle, and ellipse, when the front grille is seen from the front surface side.

Next, a second embodiment of the present invention will be described mainly with respect to matters different from the first embodiment, while referring to FIGS. 9 to 12.

Figure 10:
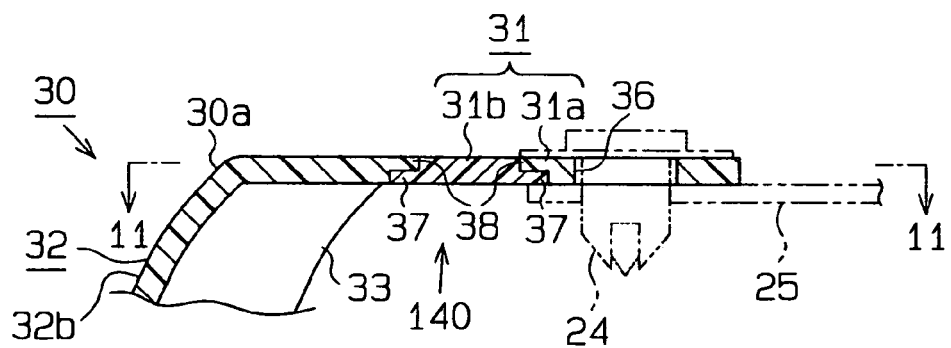
FIG. 10 is a sectional view taken along the line 10—10 of FIG. 9.

In the second embodiment, the attaching portion 31 shown in FIG. 10 includes a portion to be deformed 140 which is deformed to allow movement of the whole grille main body 30 with respect to the vehicle body 25, when the load acts on the outer surface of the grille main body 30.

Figure 11:
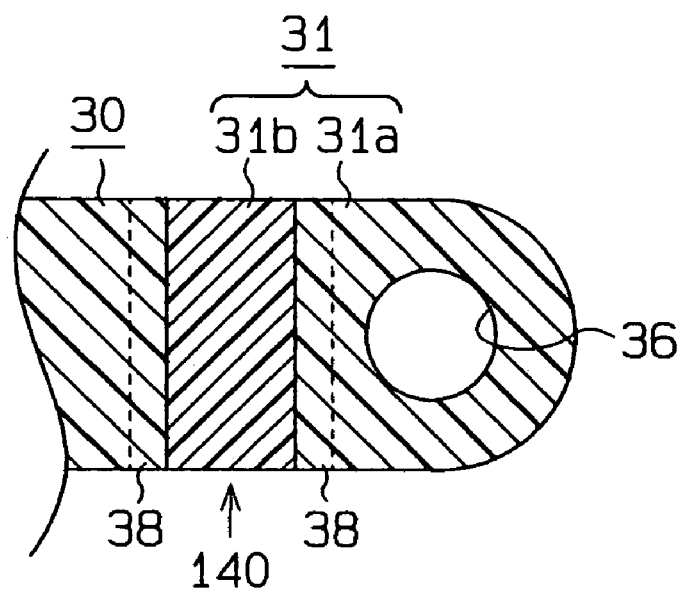
FIG. 11 is a sectional view taken along the line 11—11 of FIG. 10.

As shown in FIGS. 10 and 11, the attaching portion 31 includes a first resin portion 31a in which a through hole 36 capable of passing the clip 24 is formed, and a second resin portion 31b which has a rigidity lower than that of the first resin portion 31a and which is disposed between the grille main body 30 and first resin portion 31a and which connects the grille main body to the first resin portion 31a. The second resin portion 31b constitutes the portion to be deformed 140.

For example, the same material as that constituting the grille main body 30 is usable as the material constituting the first resin portion 31a. On the other hand, a soft ABS resin is usable as the material constituting the second resin portion 31b, for example, when the first resin portion 31a is formed of the ABS resin. Moreover, the attaching portion 31 is integrally molded by a double molding process at the time of the injection molding of the grille main body 30.

In addition, in the present embodiment, a step portion 37 is formed on the second resin portion 31b in the connecting portion between the first resin portion 31a and second resin portion 31b. The step portion 37 has a thickness which is substantially half that of the second resin portion 31b, and protrudes toward the first resin portion 31a from a lower half of the second resin portion 31b. On the other hand, a bonding portion 38 to be bonded to the step portions 37 is disposed on the first resin portion 31a.

Furthermore, the step portion 37 is formed on the second resin portion 31b also in the connecting portion between the grille main body 30 and second resin portion 31b. The step portion 37 has a thickness which is substantially half that of the second resin portion 31b, and protrudes toward the grille main body 30 from the lower half of the second resin portion 31b. On the other hand, the bonding portion 38 to be bonded to the step portions 37 is provided on the grille main body 30.

Figure 12:
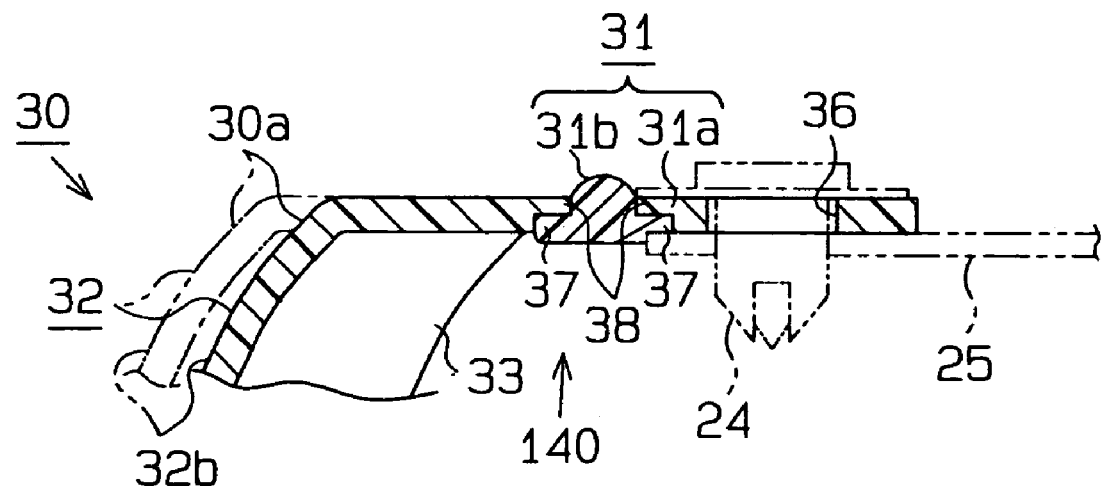
FIG. 12 is an enlarged partial sectional view showing an attaching portion at a time when a second resin portion is deformed.

In the front grille including the attaching portion 31 constituted in this manner, for example, as shown in FIG. 12, when the shock load directed rearward in the vehicle acts on the front surface 30a of the grille main body 30, the grille main body 30 is pressed rearward. Accordingly, the second resin portion 31b is elastically deformed by flexure or plastically deformed by crushing due to a pressing force from the grille main body 30. Alternatively, the grille main body 30 is detached from the second resin portion 31b, or the second resin portion 31b is detached from the first resin portion 31a, so that the second resin portion 31b drops off the grille main body 30 or the attaching portion 31.

Moreover, for example, when the shock load in the vertical direction or the transverse direction of the vehicle acts on the outer surface of the grille main body 30, the second resin portion 31b is pulled by the grille main body 30. Thus, the second resin portion 31b is elastically deformed by extension or plastically deformed by breakage. Alternatively, the grille main body 30 is detached from the second resin portion 31b, or the second resin portion 31b is detached from the first resin portion 31a, so that the second resin portion 31b falls off the grille main body 30 or the attaching portion 31.

Therefore, in accordance with the second embodiment, the following advantages are obtained.

(1) In the present embodiment, the portion to be deformed 140, which is deformed when the load acts on the outer surface of the grille main body 30 to allow the movement of the whole grille main body 30 with respect to the vehicle body 25, is provided in the attaching portion 31. Moreover, the portion to be deformed 140 comprises the second resin portion 31b which is lower in rigidity than the first resin portion 31a and which is disposed between the grille main body 30 and first resin portion 31a to connect the body to the portion.

Accordingly, when the shock load acts on the outer surface of the grille main body 30, the second resin portion 31b is elastically deformed, plastically deformed, or falls off, so that a part of the shock load is absorbed. Therefore, the protection properties with respect to pedestrians are enhanced.

Moreover, for example, with the grille main body 30 molded using the hard resin material, even when the thickness of the grille main body 30 is reduced, rigidity capable of bearing wind pressure undergone by the grille main body 30 when the vehicle is driven, is easily secured as compared with a case where the body is molded using soft resin material. Therefore, increase of the weight of the front grille is suppressed.

(2) In the second embodiment, the step portion 37 is disposed on the second resin portion 31b, and the bonding portion 38 to be bonded to the step portion 37 is disposed on the first resin portion 31a in the connecting portion between the first resin portion 31a and second resin portion 31b. Also in the connecting portion between the grille main body 30 and second resin portion 31b, the step portion 37 is disposed on the second resin portion 31b, and the bonding portion 38 to be bonded to the step portion 37 is disposed on the grille main body 30.

Accordingly, the bonding area of the connecting portion between the grille main body 30 and second resin portion 31b or the second resin portion 31b and first resin portion

31a is enlarged without increasing the plate thickness of the grille main body 30 or the attaching portion 31. Therefore, the bonding strength of the connecting portion is enhanced without increasing the weight of the front grille. When the bonding strength of the connecting portion is increased, assembly properties in attaching the front grille to the vehicle body 25 and durability during normal driving of the vehicle 20 is maintained to at a high level.

(3) In the second embodiment, the attaching portion 31 is integrally molded, for example, by the double molding process or the like during injection molding of the grille main body 30. This can suppress an increase in the number of components of the front grille and an increase in manufacturing cost.

It is to be noted that the second embodiment of the present invention may also be modified as follows.

In the second embodiment, the number of steps of each step portion 37 of the second resin portion 31b is not limited to one, and can be appropriately changed in accordance with the size of the front grille or the plate thicknesses of the grille main body 30 and the attaching portion 31. The step portion 37 may also be omitted.

In addition, for example, a tapered portion may be provided on one of the grille main body 30 and the second resin portion 31b or one of the second resin portion 31b and first resin portion 31a, while the bonding portion to be bonded to the tapered portion may be provided on the other of the grille main body 30 and the second resin portion 31b or the other of the second resin portion 31b and the first resin portion 31a.

In the second embodiment, the grille main body 30 may also be connected to the second resin portion 31b, for example, by vibration welding, ultrasonic welding, adhesive bonding or the like. The second resin portion 31b may also be connected to the first resin portion 31a, for example, by vibration welding, ultrasonic welding, adhesive bonding or the like.

Next, a third embodiment of the present invention will be described mainly with respect to matters different from the second embodiment with reference to FIGS. 13 to 15. It is to be noted that in FIGS. 13 to 15, the same constitution as that of the second embodiment is denoted with the same reference numerals.

In the third embodiment, the constitution of the attaching portion 31 is different from that of the second embodiment.

Figure 13:
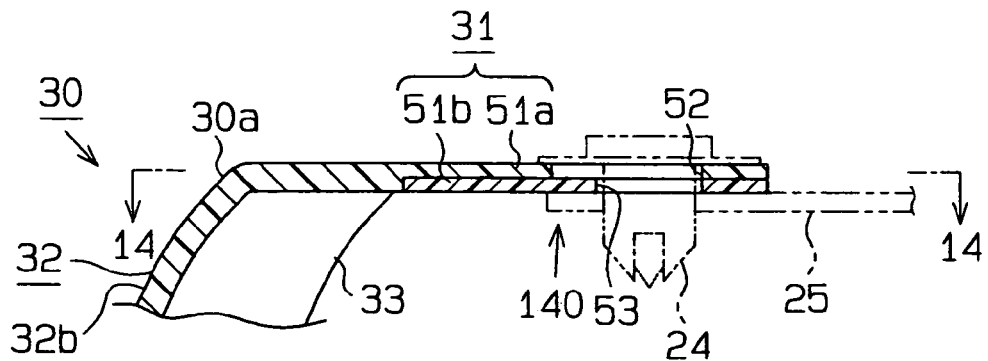
FIG. 13 is an enlarged partial sectional view showing the attaching portion of the front grille of a third embodiment.
Figure 14:
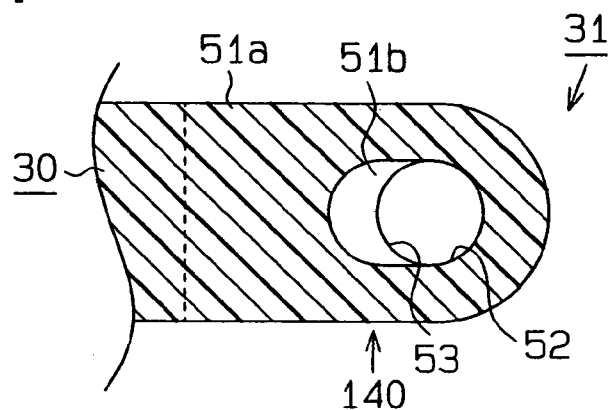
FIG. 14 is a sectional view taken along the line 14—14 of FIG. 13.

As shown in FIGS. 13 and 14, the attaching portion 31 includes a first resin portion 51a protruding rearward in the vehicle from the grille main body 30 and a second resin portion 51b superposed upon the lower surface of the first resin portion 51a.

The first resin portion 51a includes an elongated hole 52 which is capable of passing the clip 24 and which allows the clip 24 to displace toward the grille main body 30 in the vicinity of the tip rather than the middle of the first resin portion 51a. The same material as that constituting the grille main body 30 is usable as the material constituting the first resin portion 51a, and is integrally molded with the grille main body 30.

On the other hand, the second resin portion 51b has a rigidity lower than that of the first resin portion 51a and includes a through hole 53 which is capable of passing the clip 24 in the position of the elongated hole 52 on the tip side of the first resin portion 51a, and a part of the second resin portion 51b is exposed to the elongated hole 52 of the first resin portion 51a. Moreover, the exposed portion of the first resin portion 51a in the elongated hole 52 constitutes the portion to be deformed 140 in the second resin portion 51b.

For example, when the first resin portion 51a is formed of ABS resin, the soft ABS resin is usable as the material constituting the second resin portion 51b. The second resin portion 51b is integrally molded with the first resin portion 51a by the double molding process during injection molding of the grille main body 30 (first resin portion 51a).

Figure 15:
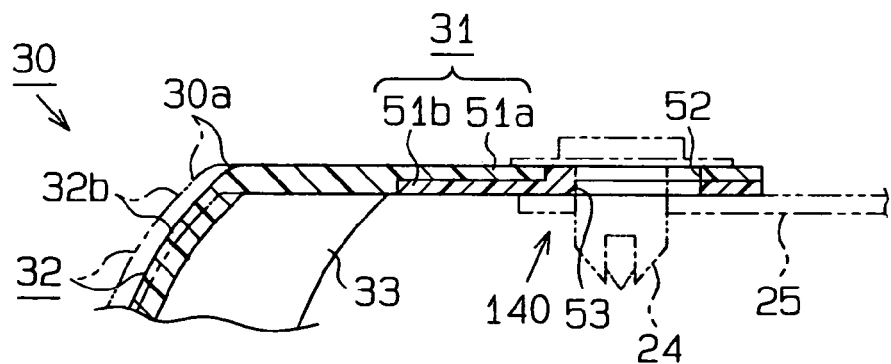
FIG. 15 is an enlarged partial sectional view showing the attaching portion at a time when the second resin portion is deformed.

In the front grille having the attaching portion 31 constituted in this manner, as shown in FIG. 15, for example, when the shock load directed rearward in the vehicle acts on the front surface 30a of the grille main body 30, the grille main body 30 is pressed rearward. Then, the attaching portion 31 moves together entirely with the grille main body 30 rearward in the vehicle, and the clip 24 is relatively displaced toward the proximal end from the tip of the first resin portion 51a in the elongated hole 52. At this time, the exposed portion of the second resin portion 51b in the elongated hole 52 of the first resin portion 51a is elastically or plastically deformed so as to be crushed by the clip 24.

Therefore, in accordance with the third embodiment, advantages similar to those described in items (1) and (3) in the first embodiment are obtained.

It is to be noted that the third embodiment may also be modified as follows.

In the third embodiment, the second resin portion 51b is not limited to the constitution in which the second resin portion is superposed upon only the lower surface of the first resin portion 51a. The second resin portion 51b may also be superposed on only the upper surface of the first resin portion 51a, or on both the upper and lower surfaces of the first resin portion 51a.

Figure 16:
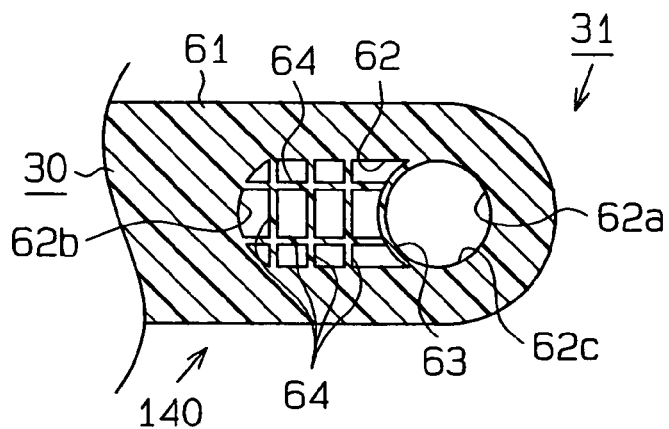
FIG. 16 is an enlarged partial sectional view showing the attaching portion of the front grille of a fourth embodiment.

Next, a fourth embodiment of the present invention will mainly be described with respect to matters different from the third embodiment with reference to FIG. 16. It is to be noted that the same constitution as that of FIGS. 13 to 15 is denoted with the same reference numerals in FIG. 16.

The fourth embodiment is the same as the third embodiment in that the attaching portion 31 has an elongated hole capable of passing the clip 24 (see FIG. 13) and allowing relative displacement of the clip 24 with respect to the grille main body 30. However, the fourth embodiment is different from the third embodiment in the constitution of the portion to be deformed 140.

As shown in FIG. 16, the attaching portion 31 has a resin portion 61 protruding rearward in the vehicle from the grille main body 30 (see FIG. 13). An elongated hole 62 is disposed in the center of the resin portion 61.

A circular positioning rib 63 is disposed on an end 62a of the attaching portion 31 on the tip side in the inner periphery of the elongated hole 62. A round hole 62c capable of passing the clip 24 is formed by the inner peripheral surface of the end 62a in the elongated hole 62 and that of the positioning rib 63.

A plurality of grille ribs 64 orthogonal to one another are disposed on portions divided by the inner peripheral surface of an end 62b of the attaching portion 31 on the proximal end side and the outer peripheral surfaces of the, positioning ribs 63 in the elongated hole 62.

The positioning rib 63 and grille ribs 64 are formed in thin plate shapes to constitute the portion to be deformed 140. The whole attaching portion 31 including the positioning rib 63 and the grille ribs 64 is formed using the same material as that constituting the grille main body 30, and is integrally molded with the grille main body 30. The respective ribs 64 are bridged between the inner wall surfaces of the elongated hole 62 which face each other.

In the front grille including the attaching portion 31 constituted in this manner, for example, when a shock load directed rearward in the vehicle acts on the front surface 30a of the grille main body 30, the grille main body 30 is pressed rearward in the vehicle. Then, the attaching portion 31 moves rearward entirely together with the grille main body 30, and the clip 24 is relatively displaced at the proximal end from the tip of the resin portion 61 with respect to the grille main body 30. At this time, first, the positioning rib 63 contacts the clip 24 and is broken. Next, the grille ribs 64 contact the clip 24 and are broken.

Therefore, in accordance with the present embodiment, advantages similar to those described in items (1) and (3) of the second embodiment are obtained.

It is to be noted that the fourth embodiment may also be modified as follows.

In the fourth embodiment of FIG. 16, the number or plate thicknesses of the grille ribs 64 may be appropriately changed in accordance with the desired rigidity. Moreover, the respective grille ribs 64 are not limited to the constitution in which the ribs are orthogonal to one another. For example, the ribs may be disposed so as to intersect with one another at an angle other than right angles, extend in parallel with the protruding direction of the attaching portion 31, or cross that direction at right angles.

Figure 17:
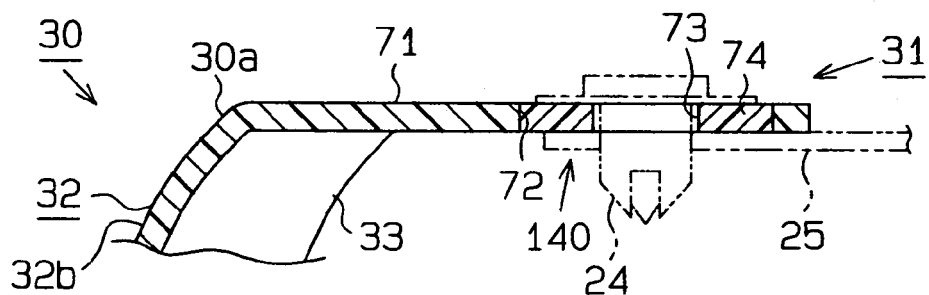
FIG. 17 is an enlarged partial sectional view showing the attaching portion of the front grille of a fifth embodiment.

Next, a fifth embodiment of the present invention will be described mainly with respect to matters different from the second embodiment with reference to FIG. 17. It is to be noted that the same constitution as that of FIGS. 9 to 12 is denoted with the same reference numerals in FIG. 17.

In the fifth embodiment, the constitution of the attaching portion 31 is different from that of the second embodiment. As shown in FIG. 17, the attaching portion 31 includes a first resin portion 71 protruding rearward in the vehicle from the grille main body 30. A through hole 72 having an inner diameter larger than an outer diameter of the clip 24 is formed in the first resin portion 71. For example, the same material as that constituting the grille main body 30 is usable as the material constituting the first resin portion 71, and the first resin portion is molded integrally with the grille main body 30.

In addition, the first resin portion 71 includes a second resin portion 74 fitted in the through hole 72 and including an insertion hole 73 capable of passing the clip 24. The second resin portion 74 is lower in rigidity than the first resin portion 71, and constitutes the portion to be deformed 140. For example, when the first resin portion 71 is formed of ABS resin, the soft ABS resin is usable in the material constituting the second resin portion 74. The second resin portion 74 is molded integrally with the first resin portion 71 by the double molding process or the like during injection molding of the grille main body 30 (first resin portion 71).

In the front grille including the attaching portion 31 constituted in this manner, when the shock load directed rearward in the vehicle acts on the front surface 30a of the grille main body 30, the grille main body 30 is pressed rearward in the vehicle. Then, the attaching portion 31 moves rearward entirely together with the grille main body 30, and the clip 24 is relatively displaced toward the proximal end of the first resin portion 71 from the center portion of the through hole 72 of the first resin portion 71. In this case, the second resin portion 74 is pressed by the outer peripheral surface of the clip 24 and the inner peripheral side of the through hole 72 to be elastically or plastically deformed.

Therefore, in accordance with the present embodiment, advantages similar to those described in items (1) and (3) in the second embodiment are obtained.

It is to be noted that the fifth embodiment may also be modified as follows.

In the fifth embodiment, the present invention is not limited to the constitution in which the second resin portion 74 is molded integrally with the first resin portion 71. The second resin portion 74 may be formed separately from the first resin portion 71 and fitted in the through hole 72 of the first resin portion 71.

Next, a sixth embodiment of the present invention will be described mainly with respect to matters different from the second embodiment with reference to FIG. 18. It is to be noted that FIG. 18 corresponds to the 11—11 line sectional view of FIG. 10, and the same constitution as that of FIGS. 9 to 12 is denoted with the same reference numerals in FIG. 18.

In the sixth embodiment, the constitution of the attaching portion 31 is different from that of the second embodiment.

Figure 18:
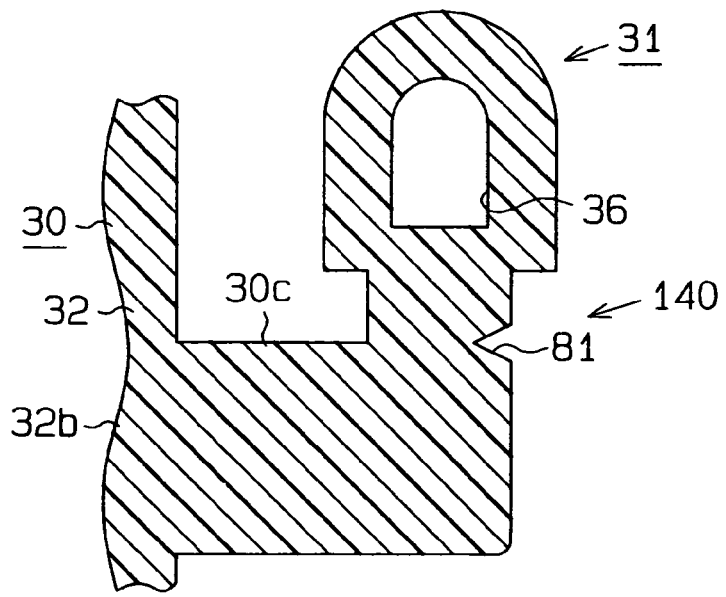
FIG. 18 is an enlarged partial sectional view showing the attaching portion of the front grille of a sixth embodiment.

As shown in FIG. 18, a protruding portion 30c protruding rearward in the vehicle (to the right in FIG. 18) is disposed in a portion of the grille main body 30 corresponding to the attaching portion 31. Moreover, the attaching portion 31 is disposed on the protruding portion 30c so as to protrude sideways from the tip of the protruding portion.

The attaching portion 31 comprises a resin portion molded using the same material as that constituting the grille main body 30, and is molded integrally with the grille main body 30. The attaching portion 31 also includes the through hole 36 capable of passing the clip 24 in the vicinity of the tip of the portion.

In the present embodiment, the cross-sectional shape of the through hole 36 along a plane orthogonal to the center line of the through hole 36 is not circular. That is, the through hole 36 has a non-circular opening shape. In detail, the portion of the through hole 36 on the proximal end side of the attaching portion 31 has a half-rectangular shape, and the portion of the hole on the tip side of the attaching portion 31 has a half-circular shape. The sectional shape of the clip 24 is formed to be analogous to the opening shape of the through hole 36. The opening shape of an engagement hole of the clip 24 in the vehicle body 25 may also be formed to be analogous to the opening shape of the through hole 36. It is to be noted that the through hole 36 may also be formed in such a manner that the opening shape of the hole has a polygonal shape such as triangular, quadrangular and pentagonal shapes, an elliptic shape, a cross shape or the like.

Furthermore, in the present embodiment, a cutout portion 81 constituting the portion to be deformed 140 is formed in the connecting portion between the grille main body 30 and attaching portion 31. In detail, the cutout portion 81 is formed in an outer edge of the connecting portion on the rear side of the vehicle. Moreover, the cutout portion 81 forms the triangular groove.

In the front grille including the attaching portion 31 constituted in this manner, when the shock load directed rearward in the vehicle acts on the front surface 30a of the grille main body 30, the grille main body 30 is pressed rearward in the vehicle. Accordingly, the stress is concentrated on the cutout portion 81, and the connecting portion between the grille main body 30 and attaching portion 31 is broken in the cutout portion 81.

Therefore, in accordance with the present embodiment, in addition to the advantages described in item (1) in the second embodiment, the following advantages are obtained.

(4) In the present embodiment, the cutout portion 81 of the attaching portion 31 is the triangular groove. Accordingly, for example, when the shock load acts on the outer surface of the grille main body 30, the stress generated in the grille main body 30 can be locally concentrated in the very small region of the bottom of the cutout portion 81. Therefore, the grille main body 30 can be broken from the cutout portion 81 which is the start point immediately after the shock load acts.

(5) In the present embodiment, the through hole 36 of the attaching portion 31 is formed in a non-circular shape. With this configuration, the attaching portion 31 can be non-rotatable about a center at the clip 24 in a state in which the grille main body 30 is attached to the vehicle body 25 via the clip 24. Therefore, for example, even when the grille main body 30 is pushed rearward in the vehicle by the shock load, the attaching portion 31 is prevented from rotating about a center at the clip 24 with the movement of the grille main body 30. As a result, the grille main body 30 is broken in the cutout portion 81 immediately after the shock load acts.

It is to be noted that the sixth embodiment may be modified as follows.

In the sixth embodiment, the cutout portion 81 may also be disposed on the whole periphery of the connecting portion between the grille main body 30 and attaching portion 31.

In the sixth embodiment, the cutout portion 81 is not limited to a triangular groove. The cutout portion 81 may also be disposed in such a manner that the sectional shape of the portion in the plane orthogonal to the extending direction of the portion forms, for example, a circular shape, an elliptic shape, a staircase shape, a U-shape or the like.

Additionally, elements which are common in the embodiments and which may be modified are as follows.

In the respective embodiments, the disposed positions or the number of the attaching portions 31 with respect to the grille main body 30 can be appropriately changed in accordance with the structure of the vehicle body 25 or the shape or size of the grille main body 30.

Moreover, when a plurality of attaching portions 31 are disposed with respect to the grille main body 30, the arbitrary portions to be deformed among the portions to be deformed 40, 140 described in the second to sixth embodiments may also be disposed on different attaching portions 31 in one front grille.

In the respective embodiments, the structure of the grille main body 30 is arbitrary. In short, the present invention may be applied to the front grille as long as the front grille includes the grille main body 30 and the attaching portion 31.

The main aspects of a seventh embodiment of the present invention different from that of the respective above-described embodiments will hereinafter be described with reference to FIGS. 19 and 20.

Figure 19:
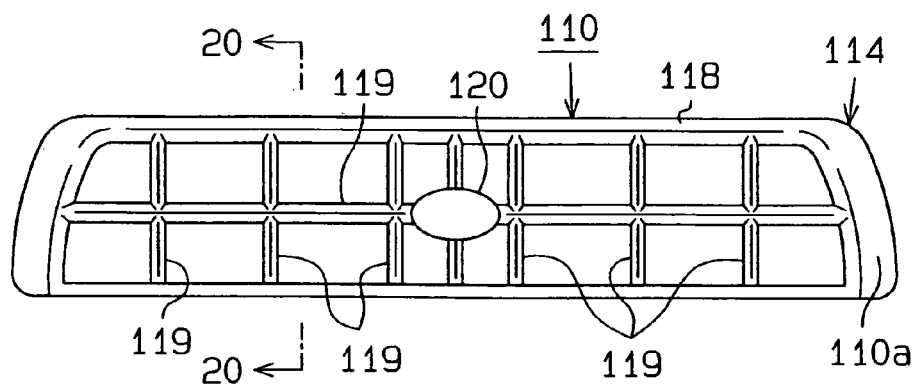
FIG. 19 is a front view of the front grille of a seventh embodiment.

As shown in FIG. 19, a grille main body 114 includes a frame portion 118 and grille portions 119 disposed inside the frame portion 118. The grille portions 119 may have a meshed shape or a bar shape extending in a transverse or longitudinal direction of the vehicle, and the shape of the grille portion 119 is not especially limited. An ornament 120 is attached to the center of the frame portion 118, but the ornament 120 may also be omitted.

Figure 20:
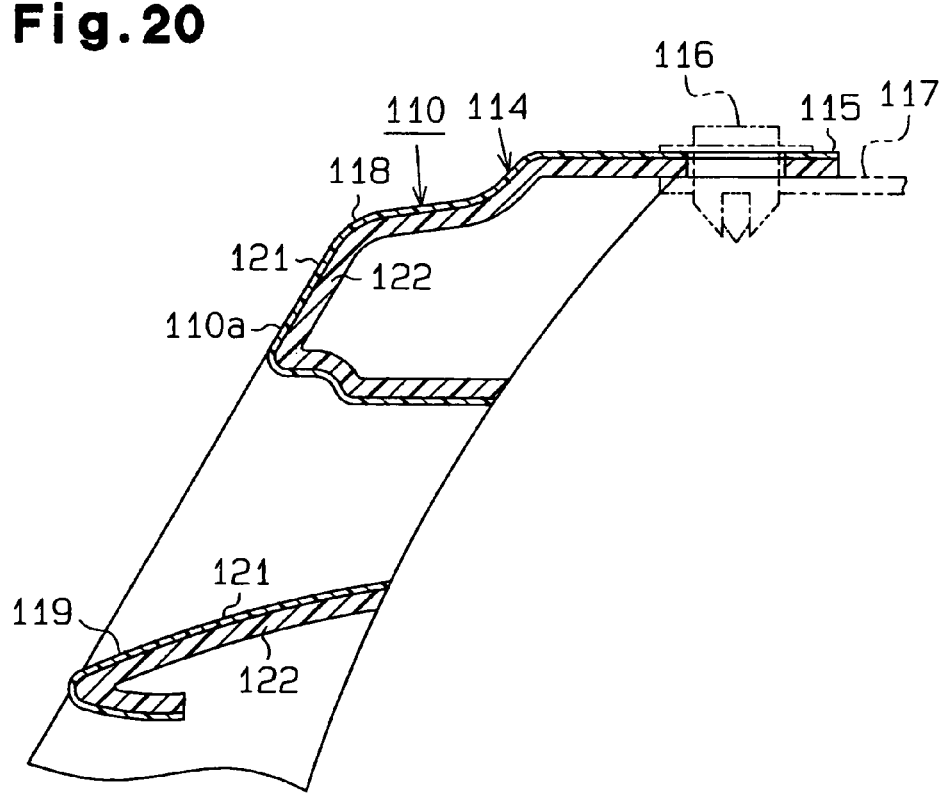
FIG. 20 is a sectional view of the front grille taken along the line 20—20 of FIG. 19.

As shown in FIG. 20, the grille main body 114 and an attaching portion 115 are integrally formed by stacking two synthetic resin layers different in modulus in flexure from each other, and includes a soft layer 121 formed of a soft synthetic resin and a hard layer 122 formed of a hard synthetic resin. The soft synthetic resin is a synthetic resin having a modulus in flexure of 500 to 1500 MPa, preferably 800 to 1200 MPa, and, for example, a soft acrylonitrile butadiene styrene (ABS) resin is usable. The hard synthetic resin is a synthetic resin having modulus in flexure of 1500 to 3000 MPa, preferably 2000 to 2800 MPa, and, for example, an ABS resin is usable. The soft layer 121 constitutes a front surface 110a of a front grille 110, and the hard layer 122 constitutes the back surface of the front grille. The hard layer 122 is constituted to be thicker than the soft layer 121 in order to secure the rigidity of the front grille 110.

The front grille 110 is manufactured by a double molding process using an injection molding process. After one of the soft layer 121 and the hard layer 122 is molded, a slide core of a mold is moved to mold the other of the soft layer 121 and the hard layer 122. Accordingly, the soft layer 121 and the hard layer 122 are stacked on each other and thermally bonded to manufacture the front grille 110.

Next, the function of the present embodiment will be described.

When an object or the like hits the front part of the vehicle, the front grille 110 undergoes shock from the collision. In this case, when the shock can be absorbed in the range of the modulus in flexure of the front grille 110, only the soft layer 121 and the hard layer 122 are elastically deformed and the shock can be absorbed. However, when the shock exceeds a value that can be absorbed by the modulus in flexure of the front grille 110, the front grille 110 cannot bear the shock and is broken. However, the breakage occurs mainly in the hard layer 122, and the soft layer 121 can have a large elastic deformation amount and is hardly broken. Therefore, the front grille 110 is broken into pieces, and the pieces are prevented from flying and scattering.

In accordance with the seventh embodiment, the following advantages are obtained.

(1) The grille main body 114 and the attaching portion 115 are formed of two stacked synthetic resin layers different from each other in modulus in flexure, and comprise the soft layer 121 and the hard layer 122. Therefore, when the front grille 110 undergoes shock and is broken by a collision of the vehicle, the broken pieces are prevented from flying/scattering.

(2) The front surface 110a constituting a part of the design surface of the vehicle comprises the soft layer 121, which is softer than the hard layer 122 constituting the back surface. In a collision with the front part of the vehicle, since a colliding object contacts the front surface 110a of the design surface, the shock of the collision is absorbed by the soft layer 121. Therefore, shock absorbing properties of the front grille 110 are enhanced, and protection properties with respect to pedestrians are enhanced.

(3) The front grille includes the soft layer 121, and the hard layer 122 is disposed on the back surface of the grille. Only with the soft layer 121, countermeasures such as increasing the thickness of the grille are required in order to secure such rigidity that the grille can bear the wind pressure during vehicle driving. However, since the hard layer 122 has been disposed, the rigidity of the front grille 110 is easily secured.

It is to be noted that the seventh embodiment may also be modified as follows.

The present invention is not limited to the front grille 110 in which the grille main body 114 and the attaching portion 115 comprise two layers including the soft layer 121 and the hard layer 122, and may also be applied to the front grille 110 comprising three or more layers. In this case, the number and order of the soft layers and hard layers are not especially limited. However, since the soft layer constitutes the front surface 110a as in the above-described embodiment, the shock absorbing properties are enhanced, and the protection properties with respect to pedestrians are enhanced.

In the front grille 110, the soft and hard layers may also be stacked so as to hold the soft layer between the hard layers. In this front grille 110, the outer surface is constituted of the hard layer. Therefore, when the front grille 110 is fixed to the vehicle, the grille is fixed to the body of the vehicle with good precision as compared with a case where the soft layer constitutes the outer surface.

The present invention is not limited to the front grille 110 whose front surface 110a is constituted of the soft layer 121, and may also be applied to the front grille 110 whose front surface 110a is constituted of the hard layer. In this case, since the front surface 110a is constituted of the hard layer, a bright treatment is easily performed, and design properties of the front grille 110 are easily secured as compared with constitution by the soft layer. Since the front surface 110a is constituted of the hard layer, shock of collision is absorbed by the breakage of the hard layer, and the shock is absorbed by the elasticity of the soft layer on the back surface side. Therefore, an advantage in enhancing the shock absorbing properties of the front grille 110 is anticipated.

The front grille 110 may have a constitution in which two hard synthetic resin layers different in modulus in flexure are stacked, or a constitution in which two soft synthetic resin layers different in modulus in flexure are stacked. When the synthetic resin layers different in modulus in flexure are stacked, the type of the resin is not especially limited. In the constitution in which the synthetic resin layers different in modulus in flexure are stacked, the broken pieces of the front grille 110 during breakage are inhibited from flying and scattering. In this case, the synthetic resin layers are stacked so that the layer of the synthetic resin having the lowest modulus in flexure constitutes the front surface 110a, and this enhances the protection properties of the front grille 110 with respect to pedestrians. Conversely, when the synthetic resin layers are stacked so as to constitute the front surface 110a by the layer of the synthetic resin having the highest modulus in flexure among the stacked synthetic resin layers, bright treatment is easily performed, and design properties of the front grille 110 are easily secured.

For a synthetic resin forming the hard layer 122, for example, an acrylonitrile ethylenepropylene rubber styrene (AES) resin, a PC/ABS resin or the like may also be used, and the synthetic resin is not especially limited as long as the modulus in flexure is in the range of 500 to 1500 MPa. Moreover, for the synthetic resin forming the soft layer 121, for example, a thermoplastic polyolefin (TPO) resin, a thermoplastic polyurethane (TPU) resin, soft ABS, an alloy resin of TPU/ABS or the like may also be used, and the synthetic resin is not especially limited as long as the modulus in flexure is in the range of 1500 to 3000 MPa.

Instead of the front grille 110 in which the grille main body 114 and the attaching portion 115 comprise the soft layer 121 and the hard layer 122, only the grille main body 114 may comprise the soft layer 121 and the hard layer 122 in the front grille 110. Only a part (e.g., the frame portion 118) of the grille main body 114 may comprise the stacked soft layer 121 and the hard layer 122 in the front grille 110. These may also be used for the front grille 110 in accordance with the modulus in flexure or the cost required.

The front grille 110 may also include the grille main body 114 constituted only of the frame portion 118, and the shape of the front grille 110 is not especially limited. With the grille main body 114 comprising only the frame portion 118, the soft layer 121 and the hard layer 122 are stacked to form the frame portion 118. In addition, the grille main body 114 may comprise only the grille portions 119, or only the ornament 120 attached to the front part of the vehicle. Also in this case, the soft layer 121 and the hard layer 122 are similarly stacked to form the grille main body 114.

The front grille 110 may also be fixed not only by a fixing member 116 such as the clip but also by screwing, crimping or the like. A protrusion may be disposed on the front grille 110, inserted in the hole of the vehicle, and thermally fused to fix the grille. Especially, a method of fixing the front grille 110 is not limited. The front grille 110 may not be attached to the vehicle, and may also be integral with the front bumper.

In the seventh embodiment, the hard layer 122 is formed to be thicker than the soft layer 121 in order to secure the rigidity of the front grille 110, but the thicknesses of the soft layer 121 and the hard layer 122 may appropriately be changed in consideration of the rigidity, cost and the like required for the front grille 110.

An eighth embodiment of the present invention will be described below mainly with respect to matters different from the respective embodiments with reference to the drawings.

Figure 23A:
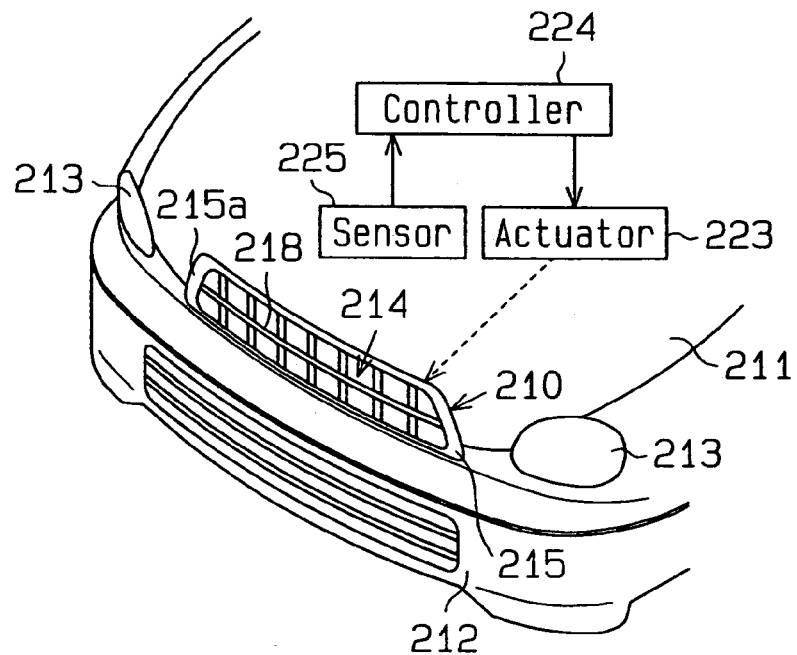
FIG. 23(a) is a schematic constitutional diagram of a shock reducing device in a normal state.
Figure 23B:
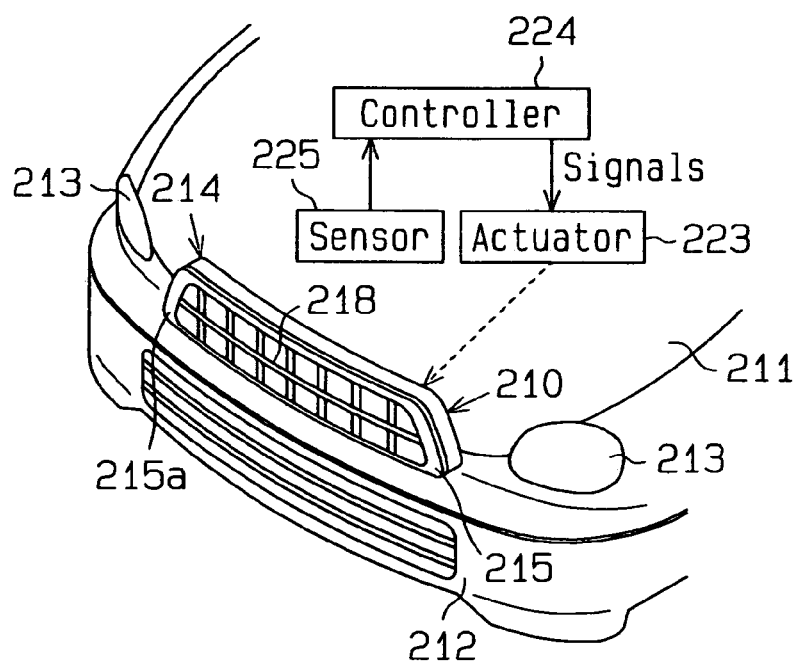
FIG. 23(b) is a schematic constitutional diagram of the shock reducing device of a protruding state of the front grille.

As clearly seen from FIGS. 23(a) and 23(b), a front grille 210 is disposed between a bonnet 211 and a front bumper 212 and between one pair of headlights 213 in the front part of the vehicle. The front grille 210 includes a grille main body 214 constituting a part of the design surface of the vehicle, and a frame portion 215 attached to the grille main body 214 along the outer edge of the main body.

Figure 21:
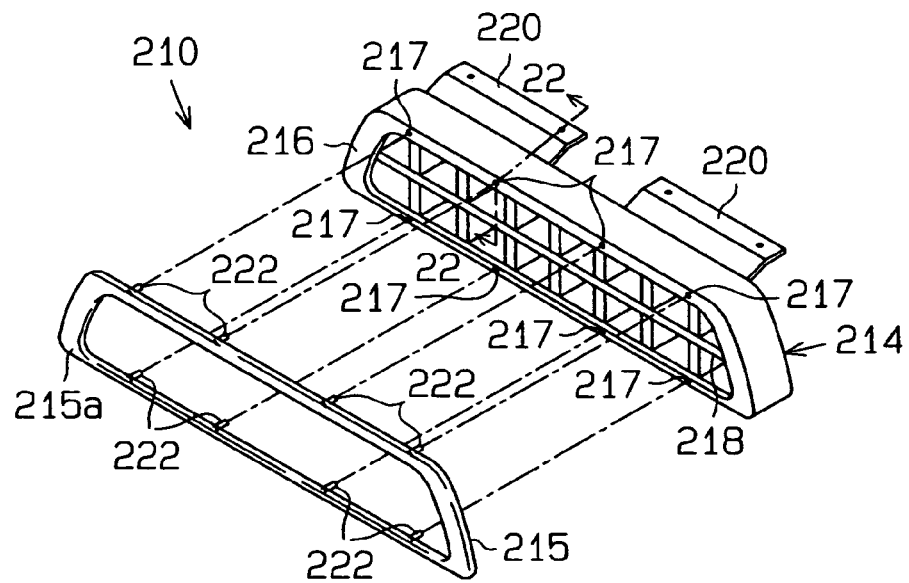
FIG. 21 is an exploded perspective view of the front grille of an eighth embodiment.
Figure 22:
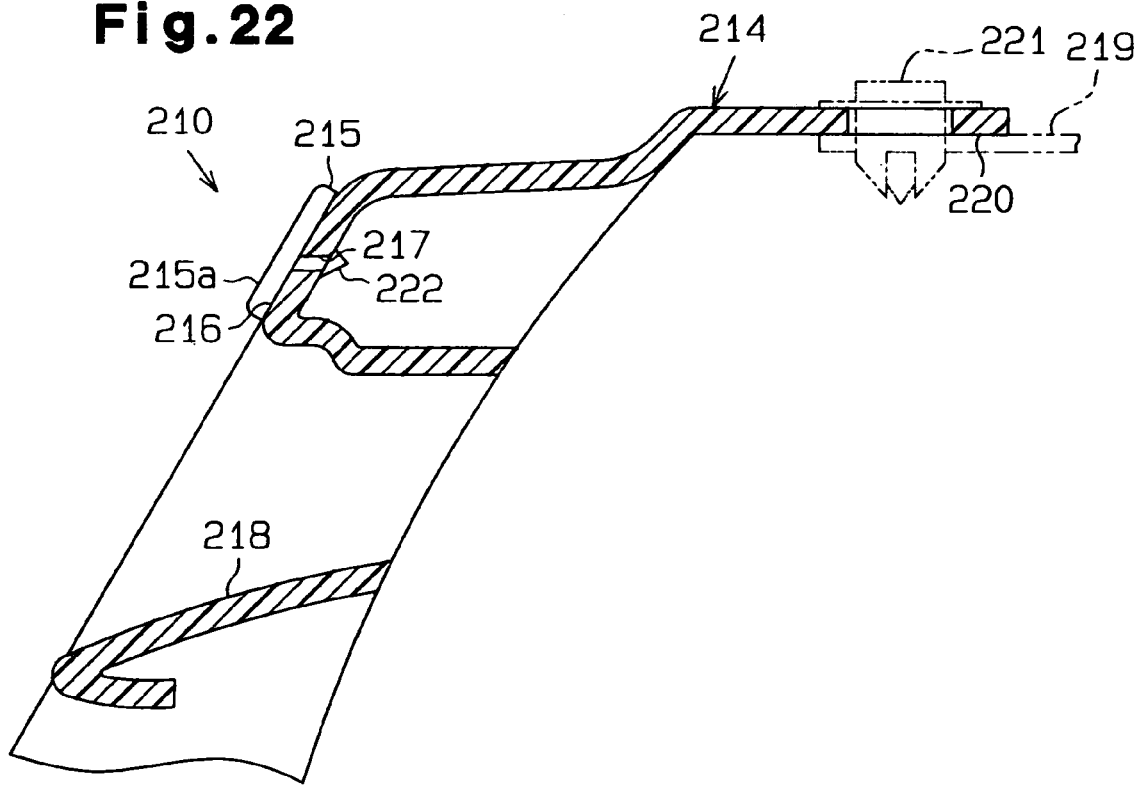
FIG. 22 is a sectional view taken along the line 22—22 of FIG. 21.

As shown in FIGS. 21 and 22, the grille main body 214 includes an attached surface 216 to which the frame portion 215 is attached, and a plurality of fixing holes 217 for use in fixing the frame portion 215. A grille portion 218 formed in a grille shape in order to take outside air into the engine compartment is disposed in the grille main body 214 so that the grill portion 218 is positioned inside the attached surface 216. It is to be noted that the grille portion 218 may have a meshed shape or a bar shape extending in the transverse or longitudinal direction of the vehicle, and the shape is not especially limited.

The grille main body 214 includes an attaching portion 220 for use in fixing the grille main body to the body 219 of the vehicle, and is attached to the vehicle body 219 by fixing members 221 such as a clip via the attaching portion 220. The grille main body 214 is formed of a synthetic resin (soft synthetic resin) whose modulus in flexure is 500 to 1500 MPa, preferably 800 to 1200 MPa, and is formed, for example, of a soft acrylonitrile butadiene styrene (ABS) resin. The grille main body 214 is manufactured by an injection molding process. As the soft synthetic resin, in addition to soft ABS, the thermoplastic polyolefin (TPO) resin, thermoplastic polyurethane (TPU) resin, alloy resin of TPU/ABS or the like may also be used.

The frame portion 215 has substantially the same shape as that of the attached surface 216 of the grille main body 214. A front surface 215a of the frame portion 215 is subjected to a flatting treatment which is a surface treatment. Moreover, as the bright treatment, a metal layer (e.g., a chromium layer) is formed by plating, vacuum deposition, or sputtering. The frame portion 215 is harder than the grille main body 214, and is formed of a synthetic resin (hard synthetic resin) having a modulus in flexure of 1500 to 3000 MPa, preferably 2000 to 2800 MPa, and, for example, of the ABS resin. The frame portion 215 is also manufactured by the injection molding process in the same manner as in the grille main body 214. As shown in FIG. 22, although the frame portion 215 is formed to be thinner than the grille main body 214, the thicknesses of the grille main body 214 and frame portion 215 are not especially limited, and may also be changed in accordance with rigidity, device properties, cost or the like required in the front grille 210.

The frame portion 215 includes a plurality of fixing portions 222 opposite to the fixing holes 217 of the attached surface 216. For example, the crimping may be used as the fixing portions 222. When protrusions for the crimping are inserted in the fixing holes 217, the frame portion 215 is fixed to the grille main body 214. Accordingly, the grille main body 214 is formed integrally with the frame portion 215 as the front grille 210.

In accordance with the eighth embodiment, the following advantages are obtained.

(1) The grille main body 214 is formed of the synthetic resin (soft synthetic resin) having a modulus in flexure of 500 to 1500 MPa. Therefore, the shock of a collision of the vehicle is absorbed by the grille main body 214. The frame portion 215 is formed of a synthetic resin (hard synthetic resin) which is harder than that forming the grille main body 214 and which has modulus in flexure of 1500 to 3000 MPa. Therefore, the frame portion 215 is easily subjected to a surface treatment such as a bright treatment. When the frame portion 215 is constituted integrally with the grille main body 214, the appearance of the front grille 210 is enhanced. That is, the grille main body 214 has a function of absorbing shock, and the frame portion 215 has a function in the design of the front grille 210. Therefore, protection properties with respect to pedestrians can be sufficiently fulfilled, and the appearance of the front grille 210 is enhanced.

(2) The grille main body 214 includes the attaching portion 220, and the front grille 210 is fixed to the vehicle body 219 by the attaching portion 220. Therefore, when the front grille 210 undergoes shock, the shock is absorbed by the attaching portion 220 of the grille main body 214. Therefore, shock absorbing properties of the front grille 210 are enhanced, and protection properties with respect to pedestrians are fulfilled.

(3) The grille main body 214 is formed of a synthetic resin softer than that of the frame portion 215, and the frame portion 215 is attached to the attached surface 216 positioned on the front surface side of the grille main body 214. Therefore, when shock is applied to the frame portion 215, the shock is not received only by the frame portion 215, and the shock is also absorbed by the elasticity of the grille main body 214 disposed rearward. Therefore, the frame portion 215 is inhibited from being broken by the shock.

(4) The front grille 210 includes not only the grille main body 214 formed of the soft synthetic resin but also the frame portion 215 formed of the hard synthetic resin. In a conventional front grille formed only of the soft synthetic resin, it is sometimes difficult to secure such rigidity so that the grille can bear wind pressure, vibration or the like during driving of the vehicle. On the other hand, even when the grille main body 214 is formed of the soft synthetic resin in the present invention, the grille main body 214 is inhibited from being deformed with the rigidity of the frame portion 215 formed integrally with the grille main body 214, and the rigidity of the front grille 210 is easily secured.

(5) Since the whole front grille is formed of the soft synthetic resin in the prior art front grille, it is difficult to perform surface treatment such as a bright treatment (vacuum deposition, sputtering). Even if surface treatment is performed, much work/labor is required so as to obtain a satisfactory surface condition, and yield is also poor. However, in the present invention, the function of the design is imparted to the frame portion 215 formed of the hard synthetic resin. The frame portion 215 is subjected to the surface treatment and thereafter attached to the grille main body 214. Therefore, a surface treatment portion is provided easily on the surface of the front grille 210 in order to enhance design properties, and cost increase in the manufacturing of the front grille 210 is suppressed.

Next, a ninth embodiment of the present invention will be described with reference to FIGS. 23(*a*) and 23(*b*). It is to be noted that the front grille of the present embodiment includes the grille main body and the frame portion basically in the same manner as in the eighth embodiment. Mainly, the matters different from those of the eighth embodiment will hereinafter be described.

As shown in FIG. 23(*a*), the grille main body 214 and frame portion 215 are disposed in the front part of the vehicle. The grille main body 214 is movably disposed so as to protrude forward from the vehicle in a guided state by a guide member (not shown) disposed in the front part of the vehicle. It is to be noted that the front grille 210 is usually fixed in a state shown in FIG. 23(*a*). The grille main body 214 is moved forward by the driving of an actuator 223. The actuator 223 drives the front grille 210 based on an operation signal from an electronic controller 224 so as to protrude the grille forward in the vehicle. It is to be noted that the actuator 223 is supposed to be of a hydraulic, pneumatic, electromagnetic, or motor driven type, but the type of the actuator is not especially limited as long as the grille main body 214 is controlled to protrude forward. It is to be noted that the actuator 223 and the electronic controller 224 constitute an operation device.

The vehicle includes a sensor 225 in the vehicle front part, and the sensor 225 is electrically connected to the electronic controller 224. The sensor 225 is supposed to include an optical, electromagnetic, or acoustic proximity sensor. It is to be noted that the sensor 225 and electronic controller 224 constitute a predicting device. The electronic controller 224 recognizes another vehicle, obstruction, or the like in the path of the vehicle based on the signal inputted from the sensor 225, and predicts the collision of the vehicle from the positions, speeds, paths and the like of the vehicle and object. It is to be noted that a shock reducing device comprises the front grille 210, the actuator 223, the electronic controller 224, and the sensor 225.

Next, the function of the present embodiment will be described.

While the vehicle is being driven, the front grille 210 is in a normal state as shown in FIG. 23(*a*). The electronic controller 224 predicts a collision between the vehicle and the object in front of the vehicle based on the signal from the sensor 225 during driving of the vehicle. When a collision of the vehicle is predicted, the electronic controller 224 outputs an operation signal to the actuator 223. Accordingly, as shown in FIG. 23(*b*), the actuator 223 operates, and the front grille 210 is pushed further forward from the other portions in the front part of the vehicle. At this time, the grille main body 214 is smoothly pushed forward in the vehicle along the guide member (not shown). Therefore, when the vehicle collides with a pedestrian by mistake, the vehicle collides in the state in which the front grille 210 is pushed outward.

The ninth embodiment has the following advantages in addition to the advantages (1) to (5) of the eighth embodiment.

(6) When the electronic controller 224 predicts a collision of the vehicle based on the signal from the sensor 225, the operation signal is outputted to the actuator 223 to protrude the front grille 210 forward. Accordingly, the front grille 210 contacts the pedestrian prior to the other portions in the front part of the vehicle at the time of a collision of the vehicle against the pedestrian. That is, at the time of the collision with the pedestrian, the front grille 210 including the grille main body 214 formed of the soft synthetic resin contacts the colliding pedestrian first. Therefore, the shock of the collision is effectively absorbed by the grille main body 214, and protection properties with respect to the pedestrian can further be enhanced.

It is to be noted that the eighth and ninth embodiments may be modified as follows.

The frame portion 215 is attached to the attached surface 216 of the grille main body 214, but the frame portion 215 may be attached directly to the body 219 of the vehicle, and the grille main body 214 does not have to be integrated with the frame portion 215 in the front grille 210. In this constitution, as in the ninth embodiment, the whole front grille 210 is not pushed forward from the vehicle, and only the grille main body 214 may be pushed forward from inside the frame portion 215. This reduces shock applied to the pedestrian.

For the synthetic resin forming the grille main body 214, for example, a thermoplastic polyolefin (TPO) resin, thermoplastic polyurethane (TPU) resin or the like may also be used, and the synthetic resin is not especially limited as long as the modulus in flexure is in the range of 500 to 1500 MPa.

For the synthetic resin forming the frame portion 215, for example, a acrylonitrile ethylenepropylene rubber-styrene (AES) resin, polycarbonate (PC)/ABS resin or the like may also be used, and the synthetic resin is not especially limited as long as the modulus in flexure is in the range of 1500 to 3000 MPa.

As bright treatment of the frame portion 215, the metal layer has been formed by sputtering or vacuum deposition to enhance the design properties, but a lustrous thin film may also be formed on the frame portion 215. The bright treatment is not especially limited as long as the treatment contributes to the enhancement of the design properties of the front grille 210. The frame portion 215 has been subjected to the flattening treatment as the surface treatment, but the painting may also be performed, and the surface treatment is not especially limited.

By the use of the actuator capable of not only pushing the grille main body 214 forward but also moving the grille main body 214 forward and backward, a shock reducing device capable of controlling and projecting/retracting the front grille 210 is formed. Accordingly, when a collision is predicted by the predicting device to push the grille main body 214 forward, but a collision is actually avoided, the electronic controller 224 determines this to drive the actuator, so that the grille main body 214 is returned to the usual position. In this case, it is necessary to newly dispose a collision sensor for determining whether or not the vehicle has collided with another vehicle.

The attaching portion 220 is not limited to the constitution in which the portion is molded integrally with the grille main body 214 and formed of the soft synthetic resin, and may also have a constitution in which only the attaching portion 220 is formed of the synthetic resin harder than that of the grille main body 214. This can enhance attachment precision of the front grille 210 onto the vehicle.

The frame portion 215 is not limited to the shape attached along the outer edge of the grille main body 214, and the shape is changed in accordance with the required appearance. For example, the frame portion may also be formed so as to cover the front surface of the grille portion 218 of the grille main body 214, and the shape of the frame portion 215 is not especially limited.

The shape of the grille main body 214 is not limited to that of the above-described in each embodiment, and may have, for example, a frame shape similar to that of the frame portion 215. The shape of the grille main body 214 is not especially limited.

The front grille may also be formed integrally with the front bumper instead of the front grille 210 attached to the body 219 of the vehicle.

Instead of the shock reducing device having the front grille 210 including the frame portion 215 for the purpose of enhancing appearance, a shock reducing device may include the front grille 210 only of the grille main body 214 without disposing the frame portion 215 for the purpose of enhancing protection properties with respect to pedestrians. Moreover, the front grille 210 including the grille main body 214 may simply be pushed forward. This can enhance shock absorbing properties, because the frame portion 215 is not disposed as compared with the ninth embodiment.

In the eighth embodiment, the front grille 210 is not limited to the fixed constitution by the fixing members 221 such as the clip, and the grille may also be fixed by screwing, crimping or the like. Moreover, the protrusion may be disposed on the front grille 210, inserted in the hole of the vehicle, and thermally bonded so as to fix the grille. Especially, the method of fixing the front grille 210 is not limited.

The invention claimed is:

1. A front grille for attachment to a front part of a vehicle, the front grille comprising:
   a grille main body forming apart of a design surface of the vehicle;
   an attaching portion for attaching the grille main body to the vehicle;
   a portion to be deformed, wherein the portion to be deformed is deformed when a load acts on the front grille; and
   a fixing member for fixing the front grille to a body of the vehicle,
   wherein the attaching portion comprises a first resin portion protruding from the grille main body, and the first resin portion has an elongated hole capable of receiving the fixing member, and the elongated hole allows displacement of the fixing member within the elongated hole in a protruding direction of the first resin portion, and
   wherein the portion to be deformed comprises a second resin portion, which has a rigidity lower than that of the first resin portion, and wherein the second resin portion has an insertion hold capable of receiving the fixing member such that the fixing member is located in a part of the elongated hole that is at a tip side of the first resin portion, and the second resin portion is superposed on the first resin portion so that the second resin portion is exposed in the elongated hole, and when load acts on the front grille, the exposed second resin portion deforms an enters the elongated hole.

* * * * *